United States Patent
Komura et al.

(10) Patent No.: US 6,776,812 B2
(45) Date of Patent: Aug. 17, 2004

(54) GAS LIQUID CENTRIFUGAL SEPARATOR

(75) Inventors: Norio Komura, Saitama (JP); Yutaka Hiki, Saitama (JP); Satoshi Taguchi, Saitama (JP); Kiyoshi Handa, Saitama (JP); Kazuya Miwa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/188,318

(22) Filed: Jul. 3, 2002

(65) Prior Publication Data

US 2003/0015462 A1 Jan. 23, 2003

Related U.S. Application Data

(60) Provisional application No. 60/303,064, filed on Jul. 6, 2001.

(51) Int. Cl.[7] .......................... B01D 19/00; B01D 45/12
(52) U.S. Cl. .................. 55/337; 55/355; 55/459.1; 96/157; 210/86; 210/188; 210/512.1
(58) Field of Search ................. 55/337, 355, 459.1, 55/459.4; 96/155, 157; 210/86, 188, 512.1

(56) References Cited

U.S. PATENT DOCUMENTS

| | | | | |
|---|---|---|---|---|
| 4,015,960 A | * | 4/1977 | Nutter | 55/355 |
| 4,017,275 A | * | 4/1977 | Hodgson et al. | 55/459.4 |
| 4,097,358 A | * | 6/1978 | Wiseman | 55/459.1 |
| 5,427,685 A | | 6/1995 | Thorley | |
| 6,475,256 B2 | * | 11/2002 | Matsubara et al. | 55/337 |

* cited by examiner

*Primary Examiner*—David A. Reifsnyder
(74) *Attorney, Agent, or Firm*—Arent Fox Kintner Plotkin & Kahn, PLLC

(57) ABSTRACT

A gas liquid centrifugal separator includes a cylindrical vessel having an axis extending in a vertical direction, an exhaust port in a top wall of the vessel which discharges gas separated from a liquid-gas mixture, a drainage port provided in a bottom wall of the vessel which discharges liquid separated from the liquid-gas mixture, and an introducing port in a peripheral wall of the vessel which introduces the mixture into the vessel. Gas-liquid separation is conducted by an inverted conical liquid surface formed in an upper separating chamber of the vessel as a result of the mixture traveling circumferentially along an inner peripheral surface of the vessel.

7 Claims, 4 Drawing Sheets

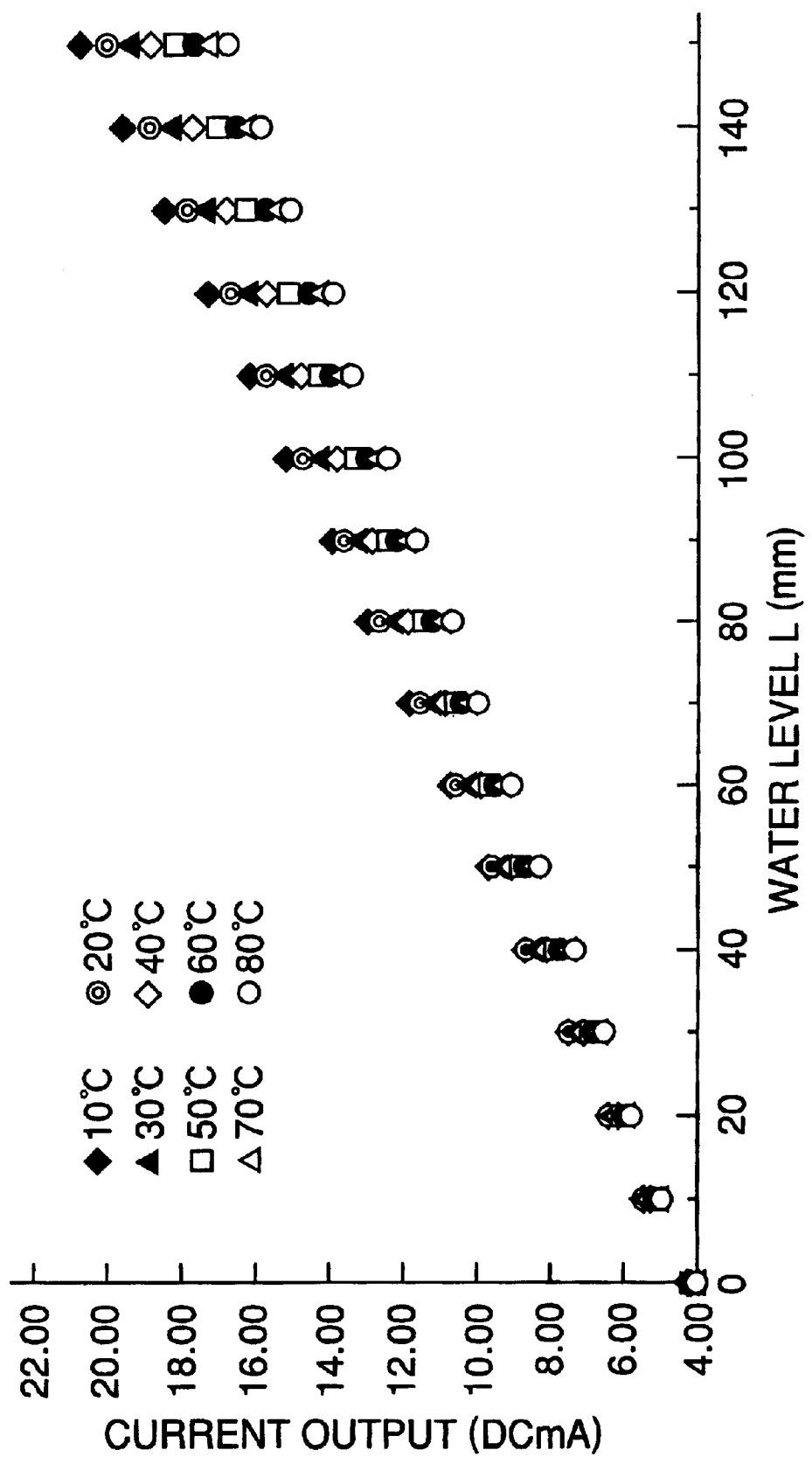

GAS LIQUID CENTRIFUGAL SEPARATOR

This nonprovisional application claims the benefit of U.S. Provisional Application No. 60/303,064, filed Jul. 6, 2001.

BACKGROUND OF THE INVENTION

1. Field of the Invention

The present invention relates to a gas liquid centrifugal separator, namely, a device for subjecting a liquid to be treated or a mixture comprising a liquid and a gas contained in the liquid to a gas-liquid separating treatment to separate the gas and the liquid from each other.

2. Description of the Related Art

In a conventional gas liquid centrifugal separator, a gas and a liquid are separated from each other by centrifugal force in a cylindrical vessel having a substantially horizontal axis, where a gas and liquid mixture is caused to circumferentially travel along an inner peripheral surface of the cylindrical vessel; the gas is discharged to the outside from a discharge port in an upper portion of an outer peripheral surface of the vessel; and the liquid is discharged to the outside from a discharge port in a lower portion of the outer peripheral surface of the vessel (see U.S. Pat. No. 5,427,685).

However, the conventional gas liquid centrifugal separator has the following disadvantages: a groove for guiding the mixture and a passage for guiding the gas separated from the liquid are provided in the cylindrical vessel, so that the internal structure of the cylindrical vessel is complicated; and if the cylindrical vessel is placed in a horizontal direction, the area occupied by the separator is increased.

SUMMARY OF THE INVENTION

Accordingly, it is an object of the present invention to provide a gas liquid centrifugal separator of the above-described type, wherein the internal structure of the cylindrical vessel is simplified, and the area occupied by the separator is decreased.

To achieve the above object, according to the present invention, there is provided a gas liquid centrifugal separator for subjecting a mixture comprising a liquid and a gas contained in the liquid to a gas-liquid separating treatment to separate the gas and the liquid from each other, comprising a cylindrical vessel having an axis extending in a vertical direction, an exhaust port provided in a top wall of said cylindrical vessel for discharging the separated gas, a drainage port provided in a bottom wall of said cylindrical vessel for discharging the separated liquid, and an introducing port provided in a peripheral wall of said cylindrical vessel for introducing said mixture into said cylindrical vessel in order to conduct the gas-liquid separation treatment utilizing an inverted conical liquid surface formed by causing said mixture to circumferentially travel along an inner peripheral surface of said cylindrical vessel.

When the mixture is caused to circumferentially travel along the inner peripheral surface of the cylindrical vessel as described above, the mixture is separated into the gas and the liquid by centrifugal force. The separated gas from the inverted conical liquid surface is collected in a space inside the inverted conical liquid surface without containing the liquid, and discharged from the exhaust port to the outside of the cylindrical vessel. On the other hand, the liquid gradually descends by its own weight, and is discharged from the drainage port to the outside of the cylindrical vessel.

It is unnecessary to provide a groove for guiding the mixture and a passage for guiding the separated gas in the cylindrical vessel, and hence the internal structure of the cylindrical vessel can be simplified. In addition, the cylindrical vessel is placed in a horizontal direction, and hence the area occupied by the separator can be decreased.

The above and other objects, features and advantages of the invention will become apparent from the following description of the preferred embodiment taken in conjunction with the accompanying drawings.

BRIEF DESCRIPTION OF THE DRAWINGS

FIG. 5 is a graph showing the relationship between the water level L and the current output.

DESCRIPTION OF THE PREFERRED EMBODIMENTS

The present invention will now be described by way of an embodiment with reference to the accompanying drawings.

Figure 1:
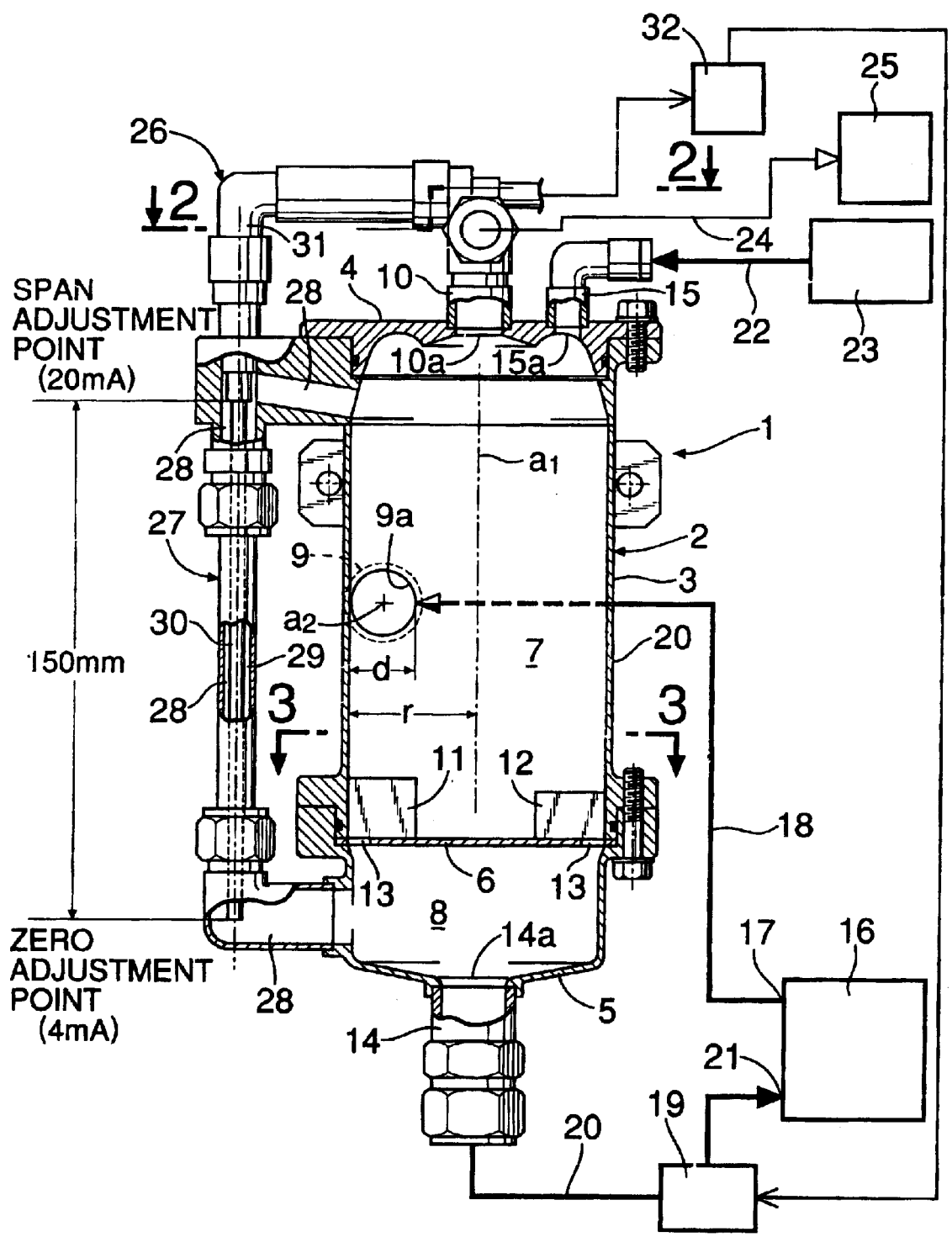
FIG. 1 is a vertical sectional front view of a gas liquid centrifugal separator, and corresponds to a sectional view taken along a line 1—1 in FIG. 2.
Figure 2:
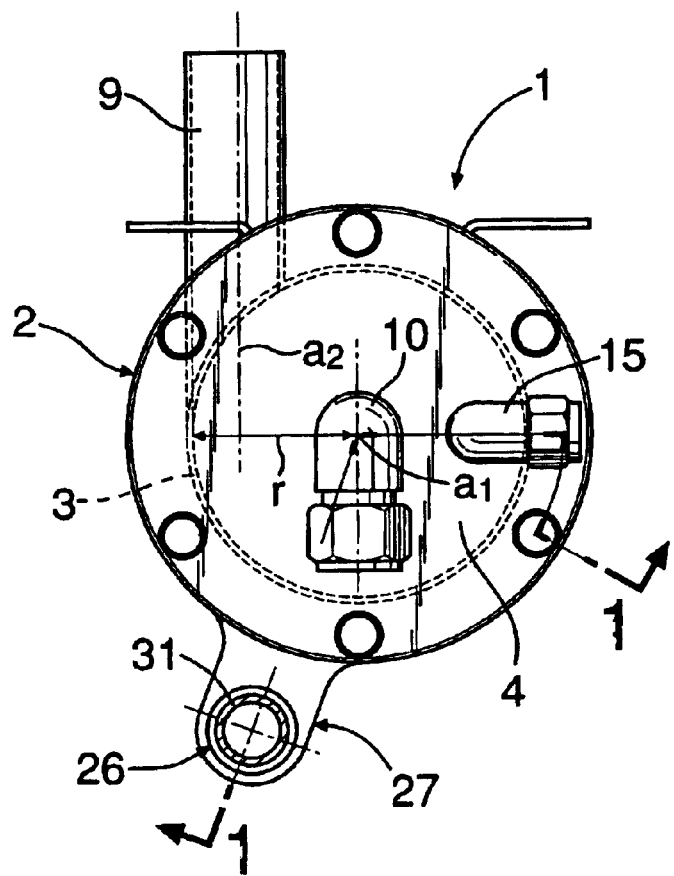
FIG. 2 is a view taken along a line 2—2 in FIG. 1.
Figure 3:
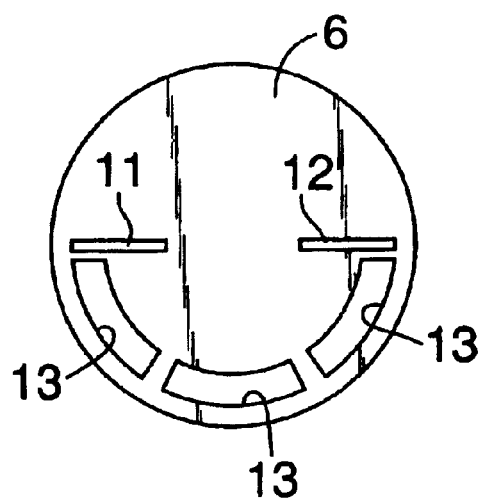
FIG. 3 is a plan view of a partition plate and corresponds to a view taken along a line 3—3 in FIG. 1.

Referring to FIGS. 1 to 3, a gas liquid centrifugal separator 1 according to an embodiment of the present invention is used for subjecting a mixture comprising water as a liquid and oxygen as a gas contained in the water to a separating treatment to separate the oxygen and the water from each other. The gas liquid centrifugal separator 1 includes a cylindrical vessel 2 having a vertically extending axis $a_1$. The vessel 2 comprises a bottomed cylindrical body $2_0$ and a top wall 4 closing an opening at an upper portion of the body $2_0$. A partition plate 6 is mounted in the bottomed cylindrical body $2_0$ at a location spaced apart from a bottom wall 5 of the body 2 by approximately one fifth of the entire length of the bottomed cylindrical body. The inside of the cylindrical vessel 2 is divided by the partition plate 6 into an upper separating chamber 7 and a lower drainage chamber 8.

A circular introducing port 9a for introducing the mixture into the separating chamber 7 is provided in a peripheral wall 3 of the bottomed cylindrical body $2_0$ at a location where the separating chamber 7 is substantially bisected vertically, and an introducing pipe 9 is connected to the introducing port 9a. An inner diameter d of the introducing port 9a is approximately one half of an inner radius r of the separating chamber 7. An axis $a_2$ of the introducing pipe 9 (a centerline of the introducing port 9a) intersects the inner radius r at a location spaced apart from the outer periphery of the inner radius r by approximately one fourth of the inner radius r. Namely, the axis $a_2$ of the introducing pipe 9 is located in the vicinity of a line tangent to the separating chamber 7 and is parallel to the tangent line.

An exhaust port 10a is provided in the top wall 4, and an exhaust pipe 10 is connected to the exhaust port 10a. Two quadrangular baffle plates 11, 12 are mounted upright on the partition plate 6. One of vertical sides of each of the quadrangular baffle plates 11, 12 is in contact with an inner peripheral surface of the separating chamber 7. Three arcuate communication bores 13 are defined along a half of a periphery of the partition plate 6, from one of the baffle plates 11 to the other baffle plate 12, and provide communication between the separating chamber 7 and the drainage chamber 8. A drainage port 14a is provided in the bottom wall 5 of the bottomed cylindrical body $2_0$ and leads to the drainage chamber 8, and a drainage pipe 14 is connected to the drainage port 14a. Further, a liquid supply port 15a is provided in the top wall 4, and a liquid supply pipe 15 is connected to the liquid supply port 15a.

The introducing pipe 9 is connected to a drainage port 17 in a water electrolyzer 16 through a conduit 18, and the drainage pipe 14 is connected to a supply port 21 in the water electrolyzer 16 through a conduit 20 having a solenoid valve 19. Further, the liquid supply pipe 15 is connected to a water supply source 23 through a conduit 22, and the drainage pipe 10 is connected to an oxygen reservoir 25 such as a tank through a conduit 24.

A known electrostatic capacity-type water level detector 26 as a means for detecting a liquid level in the cylindrical vessel 2 is attached to the cylindrical vessel 2. The detector 26 is constructed as follows: opposite ends of a square U-shaped communication member 27 are disposed on the peripheral wall 3 at an upper portion of the separating chamber 7 and an intermediate portion of the drainage chamber 8, respectively, and the inside of a communication bore 28 in the communication member 27 communicates with the separating chamber 7 and the drainage chamber 8. A rod-shaped sensor 30 is inserted into a vertical bore portion 29 of the communication bore 28 and connected at its upper end to a water level detector body 32 through a conductive member 31.

Figure 4:
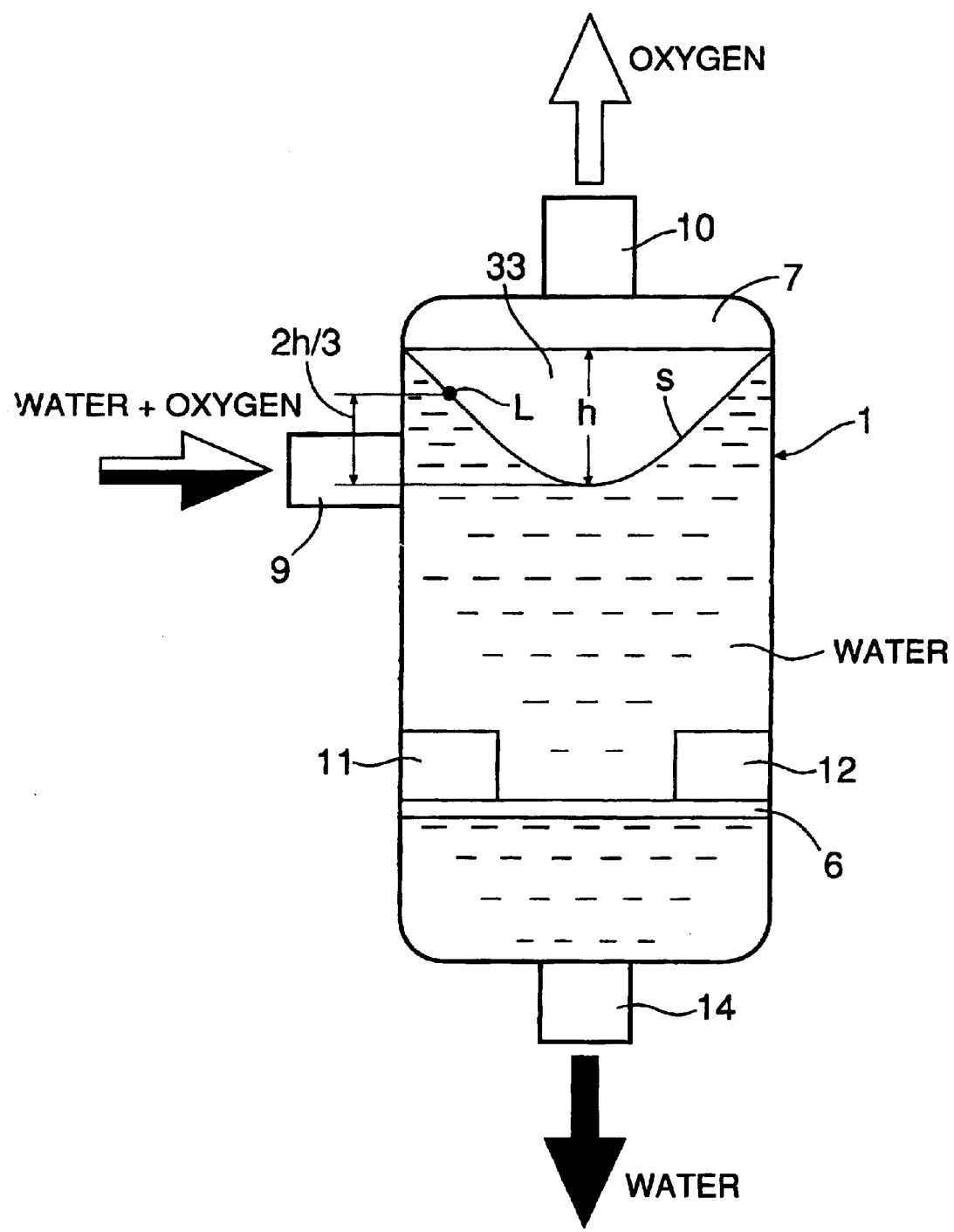
FIG. 4 is a diagram for explaining the gas-liquid separating treatment.

To treat the mixture comprising oxygen and water and discharged from the water electrolyzer 16, the liquid is introduced under a predetermined pressure into the separating chamber 7 through the introducing pipe 9 from a direction of the line tangent to the separating chamber 7. Thus, the mixture is caused to circumferentially travel along the inner peripheral surface of the separating chamber 7, and hence the liquid surface S assumes an inverted conical shape as shown in FIG. 4, and the separation of water and oxygen from each other is conducted by centrifugal force. The oxygen separated from the inverted conical liquid surface S is collected in a space 33 inside the inverted conical liquid surface S without containing water, and then introduced via the exhaust port 10a and the exhaust pipe 10 into the oxygen reservoir 25 and stored therein. On the other hand, the water gradually descends by its own weight and collides against the baffle plates 11 and 12, whereby its flow is weakened. Then, the water flows downwards through the communication bores 13 into the drainage chamber 8, passes through the drainage pipe 14 and the solenoid valve 19 in an opened state, and returns to the water electrolyzer 16.

The water level detector 26 detects, as a water level L, a position spaced by approximately 2h/3 apart from a deepest portion of the inverted conical water surface S, wherein h represents a largest depth of the inverted conical water surface S. When the water level L is lower than a predetermined position, the solenoid valve 19 is closed to raise the water level L. On the other hand, when the water level L is higher than the predetermined position, the solenoid valve 19 is opened to lower the water level L. When the water level L is too higher than the predetermined position, there is a possibility that the water is mixed into the oxygen. On the other hand, when the water level L is too lower than the predetermined position, there is a possibility that the oxygen is mixed into the water.

The water is supplied from the water supply source 23 to the water electrolyzer 16 via the liquid supply pipe 15, the separating chamber 7, the drainage chamber 8 and the solenoid valve 19.

Table 1 and FIG. 5 show the relationship between the water level L and the current output at water temperatures in a range of 10 to 80° C. In this case, the water level L is a distance from a lower end face of the sensor to the above-described position of 2h/3.

TABLE 1

| | Current output (DCmA) | | | | | | | |
|---|---|---|---|---|---|---|---|---|
| Water level L (mm) | 10° C. | 20° C. | 30° C. | 40° C. | 50° C. | 60° C. | 70° C. | 80° C. |
| 150 | 20.75 | 20.02 | 19.44 | 18.75 | 18.12 | 17.52 | 17.20 | 16.71 |
| 140 | 19.58 | 18.90 | 18.33 | 17.67 | 17.16 | 16.57 | 16.26 | 15.86 |
| 130 | 18.42 | 17.82 | 17.32 | 16.66 | 16.21 | 15.70 | 15.35 | 14.93 |
| 120 | 17.29 | 16.73 | 16.24 | 15.66 | 15.23 | 14.78 | 14.43 | 14.04 |
| 110 | 16.16 | 15.68 | 15.22 | 14.67 | 14.28 | 13.90 | 13.57 | 13.26 |
| 100 | 15.05 | 14.65 | 14.27 | 13.73 | 13.37 | 13.00 | 12.70 | 12.44 |
| 90 | 13.88 | 13.60 | 13.25 | 12.76 | 12.45 | 12.10 | 11.85 | 11.60 |
| 80 | 12.88 | 12.55 | 12.27 | 11.80 | 11.54 | 11.20 | 11.00 | 10.76 |
| 70 | 11.81 | 11.52 | 11.24 | 10.87 | 10.62 | 10.38 | 10.11 | 9.93 |
| 60 | 10.69 | 10.46 | 10.23 | 9.90 | 9.73 | 9.48 | 9.32 | 9.13 |
| 50 | 9.59 | 9.45 | 9.26 | 8.95 | 8.79 | 8.59 | 8.42 | 8.30 |
| 40 | 8.48 | 8.42 | 8.27 | 8.00 | 7.88 | 7.71 | 7.56 | 7.46 |
| 30 | 7.43 | 7.38 | 7.29 | 7.00 | 6.94 | 6.84 | 6.76 | 6.69 |
| 20 | 6.42 | 6.30 | 6.22 | 6.07 | 6.01 | 5.95 | 5.90 | 5.85 |
| 10 | 5.37 | 5.23 | 5.24 | 5.09 | 5.05 | 5.07 | 5.00 | 4.98 |
| 0 | 4.04 | 4.22 | 4.04 | 4.04 | 4.14 | 4.04 | 4.04 | 4.13 |

The position of the lower end face of the sensor 30 is defined as a water level of zero, and the water level L can be measured at pitches of 10 mm from the water level zero position to a position of a water level of 150 mm. For example, if the temperature is 20 ° C. and the current output is 12.55 DCmA, the water level L is 80 mm.

Although the embodiment of the present invention has been described in detail, it will be understood that the present invention is not limited to the above-described embodiment, and various modifications in design may be made without departing from the spirit and scope of the invention defined in the claims.

What is claimed is:

1. A gas liquid centrifugal separator for subjecting a mixture comprising a liquid and a gas contained in the liquid to a gas-liquid separating treatment to separate the gas and the liquid from each other, the gas liquid separator comprising:

a cylindrical vessel having an axis extending in a vertical direction;

a partition plate dividing said cylindrical vessel into an upper cylindrical separating chamber and a lower cylindrical discharge chamber disposed below said upper cylindrical separating chamber along said vertical axis of said cylindrical vessel;

an exhaust port provided in a top wall of said cylindrical vessel for discharging the separated gas;

a drainage port provided in a bottom wall of said cylindrical vessel opposite to said top wall, said drainage port discharging the separated liquid; and an introducing port provided in a peripheral wall of said cylindrical vessel for introducing said mixture into said cylindrical vessel in order to conduct the gas-liquid separation treatment utilizing an inverted conical liquid surface formed by causing said mixture to circumferentially travel along an inner peripheral surface of said cylindrical vessel, wherein said partition plate is disposed below said introducing port along said vertical axis of said cylindrical vessel.

2. A gas liquid centrifugal separator according to claim 1, further including at least one baffle plate disposed in a lower portion of said lower cylindrical discharge chamber, wherein the traveling mixture collides against said baffle plate.

3. A gas liquid centrifugal separator according to claim 2, further including a means for detecting a liquid level in said cylindrical vessel and which is mounted in said cylindrical vessel.

4. A gas liquid centrifugal separator according to claim 3, wherein said mixture is water which contains one of oxygen and hydrogen and which is discharged from a water electrolyzer.

5. A gas liquid centrifugal separator according to claim 1, wherein said introducing port is circular.

6. A liquid gas centrifugal separator according to claim 5, wherein an inner diameter of said introducing port is approximately one half an inner radius of said upper cylindrical separating chamber.

7. A liquid gas centrifugal separator according to claim 1, wherein a plurality of arcuate communication bores are defined along half a periphery of said partition plate and provide communication between said upper cylindrical separating chamber and said lower cylindrical discharge chamber.

* * * * *